United States Patent [19]

Araki et al.

[11] 4,384,060
[45] May 17, 1983

[54] COLORED POLYESTER COMPOSITION

[75] Inventors: Shingo Araki, Settsu; Tsutomu Igase, Suita, both of Japan

[73] Assignee: Dainippon Ink & Chemicals, Inc., Tokyo, Japan

[21] Appl. No.: 237,611

[22] Filed: Feb. 24, 1981

[30] Foreign Application Priority Data

Feb. 27, 1980 [JP] Japan .................................. 55-22840

[51] Int. Cl.³ .......................... C08K 5/34; C08L 67/02
[52] U.S. Cl. ...................................... 524/101; 524/605
[58] Field of Search ....................... 260/40 R; 524/101

[56] References Cited

FOREIGN PATENT DOCUMENTS 2628409 1/1978 Fed. Rep. of Germany .
2107064 5/1972 France .

OTHER PUBLICATIONS

*Chemical Abstracts,* vol. 77, 1972, p. 130, abstract No. 7430p, Bock, Gustav et al., "1,3-Disubstituted isoindoline pigments."
*Chemical Abstracts,* vol. 88, 1978, p. 70, abstract No. 122,669n, Lotsch, Wolfgang, "Pigment Dyes."

*Primary Examiner*—Paul Lieberman
*Assistant Examiner*—Robert E. L. Sellers
*Attorney, Agent, or Firm*—Sherman & Shalloway

[57] ABSTRACT

A colored polyester composition comprising an aromatic polyester and as a coloring agent, a barbituric acid-type pigment of the formula

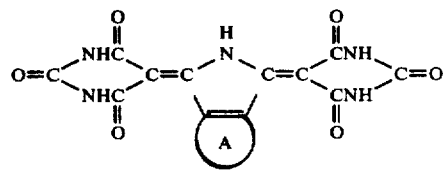

wherein

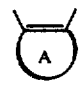

represents an o-phenylene group or a 1,2- or 2,3-naphthylene group, each of which may have a phenyl group as a substituent.

10 Claims, No Drawings

COLORED POLYESTER COMPOSITION

This invention relates to an aromatic polyester composition colored with a pigment to a brilliant transparent color.

For coloration of polyethylene terephthalate with a pigment, a method is known which comprises adding the pigment to starting ethylene glycol, dispersing it to form a colored slurry, and polycondensing the colored slurry to form colored polyethylene terephthalate. Such a method, however, has the defect of requiring high levels of technique in preventing thickening and moisture absorption of the colored slurry as well as re-aggregation of the pigment during the polycondensation reaction. A further disadvantage is that since the pigment is exposed to high temperatures for a considerably long period of time, there can only be used heat-resistant pigments such as carbon black, titanium white, phthalocyanine pigments and cadmium pigments.

Another known method involves blending uncolored polyethylene terephthalate with a colored composition obtained by dissolving a modified polyester in an organic solvent, mixing a pigment with the solution and removing the solvent, or with colored particles obtained by subjecting a pigment and ordinary polyethylene terephthalate particles to a dispersing treatment in an organic solvent having affinity for the polyethylene terephthalate; and then melting the blend. When the modified polyester is used, however, it is complex to obtain the colored composition, and since it contains a different kind of polymer, the properties of the final product obtained by using the colored composition are deteriorated. On the other hand, when ordinary polyethylene terephthalate is used, it is difficult to cover the surface of the resin uniformly with the pigment. Moreover, the covering pigment may come off and re-aggregate before the colored polyethylene terephthalate particles are melted together with uncolored polyethylene terephthalate. It is also difficult to obtain a product having the desired color density. Hence, such a method has not proved to be entirely satisfactory.

In recent years, brilliant and clear colors inherent to dyes have been preferred to pastel-like colors inherent to pigments in coloring aromatic polyester products. However, no dyes have been available up to date which have excellent fastness to light and sublimation and can withstand high temperatures of 280° to 290° C. which are the melting temperatures of polyesters.

It is an object of this invention therefore to discover a pigment capable of coloring an aromatic polyester to a brilliant and clear color.

In the course of work on dope-dyeing of aromatic polyesters with pigments, we found that a certain class of organic pigment show a dye-like behavior toward aromatic polyesters and give colored polyesters having brilliant and clear colors.

Thus, according to this invention, there is provided a colored polyester composition comprising an aromatic polyester and as a coloring agent, a barbituric acid-type pigment of the formula

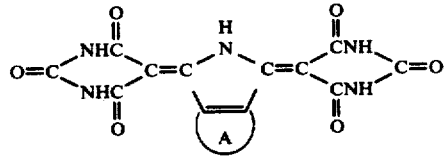

wherein

represents an o-phenylene group or a 1,2- or 2,3-naphthylene group, each of which may have a phenyl group as a substituent.

Of the barbituric acid-type pigments of the above formula, that in which

is an o-phenylene group is especially preferred because it gives a brilliant, clear yellow color and has a high utilitarian value.

We noted that when used in coloring polypropylene, the barbituric acid-type pigments of the above formula have very poor dispersibility, and the dispersed pigment shows an ordinary particulate state and has a very weak tinting strength, and that when used in coloring 6-nylon, they fade in color during the melting and become quite useless.

We have found however that when these pigments are used in the coloring of polyesters having a melting temperature of as high as 280° to 290° C., they behave like dyes during the melting and become soluble, giving transparent brilliant yellow colors, and that the resulting colored polyesters have excellent fastness to heat, light and sublimation. This fact is quite unexpected in view of the conventional common knowledge in the art.

The aromatic polyesters to be colored in the present invention includes polyesters derived mainly from (a) aromatic dicarboxylic acids such as terephthalic acid, isophthalic acid, naphthalenedicarboxylic acid, diphenyldicarboxylic acid, diphenyletherdicarboxylic acid, diphenylmethanedicarboxylic acid or diphenylsulfonedicarboxylic acid, aromatic hydroxycarboxylic acids such as β-hydroxyethoxybenzoic acid, γ-hydroxypropoxybenzoic acid or p-hydroxybenzoic acid, or ester-forming derivatives of these acids such as the lower alkyl esters thereof and (b) dihydric alcohols such as ethylene glycol, propylene glycol, trimethylene glycol, tetramethylene glycol, hexamethylene glycol, neopentyl glycol, butanediol, diethylene glycol, polyethylene glycol, cyclohexanedimethanol or bisphenol A or the ester-forming derivatives thereof. Typical examples are polyethylene terephthalate, polybutylene terephthalate, and modification products thereof with a small amount of another component.

In a color master batch of a high pigment concentration, the barbituric acid-type pigment may sometimes show a half-dissolved state. Even when such a master batch is used in coloring a polyester, the pigment will readily become soluble if the concentration of the barbituric acid-type pigment is less than 0.5% by weight (usually 0.01 to 0.5% by weight) in the final colored polyester. Accordingly, when the composition of this invention is used, it is possible to omit a kneading step which is usually required to disperse the pigment finely. A polyester of transparent color can be obtained simply by blending the pigment with a polyester, and melt-extruding the blend in a customary manner.

The composition of this invention may contain other pigments, dyes, fillers, stabilizers, etc., as required.

The following Examples illustrate the present invention. All parts in these examples are by weight.

EXAMPLE 1

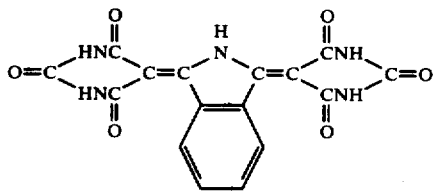

0.5 part of a pigment of the above formula was blended with 99.5 parts of polyethylene terephthalate having an intrinsic viscosity of 0.70, and the mixture was dried at 120° C. and 0.1 mmHg for 10 hours. The mixture was then melt-spun at 290° C. and drawn to form a 3-denier dope-dyed filament.

The yarn had a brilliant, clear and dense yellow color. By observation with a 400×microscope, the yarn was found to be quite free from unit particles of the pigment.

EXAMPLE 2

A blend of 10 parts of the same pigment as used in Example 1 and 90 parts of polyethylene terephthalate having an intrinsic viscosity of 0.68 was dried at 180° C. and 0.1 mmHg for 6 hours, and fed into a melt-kneading machine where it was kneaded at a melting temperature of 290° C. to form master pellets. Five parts of the master pellets were uniformly blended with 95 parts of uncolored polyethylene terephthalate, and the blend was spun at 280° C. and drawn to form a 5-denier dope-dyed filament. The filament had a brilliant clear yellow color.

EXAMPLE 3

0.2 part of the same pigment as used in Example 1 was blended with 99.8 parts of polybutylene terephthalate having an intrinsic viscosity of 0.60 and containing 30% of glass fibers, and the blend was dried at 120° C. for 4 hours. The blend was then molded at 250° C. to form a molded article colored uniformly to brilliant yellow.

EXAMPLE 4

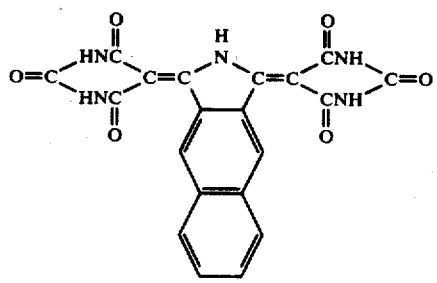

The procedure of Example 1 was repeated except that a pigment of the above structural formula was used instead of the pigment used in Example 1. A filament having a brilliant, clear and dense yellow color was obtained.

EXAMPLE 5

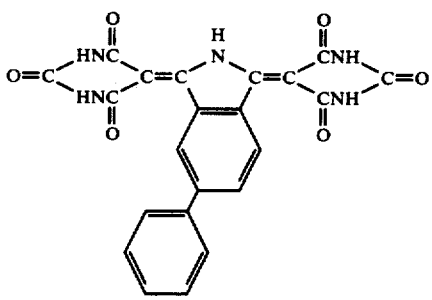

0.5 part of a pigment having the above structural formula was blended with 99.5 parts of polyethylene terephthalate having an intrinsic viscosity of 0.68, and the blend was dried at 180° C. and 0.1 mmHg for 6 hours. The blend was then molded at 290° C. to form a molded article uniformly colored to brilliant yellow.

What we claim is:

1. A melt-kneaded colored aromatic polyester shaped article comprising an aromatic polyester and as a coloring agent, a barbituric acid-type pigment of the formula

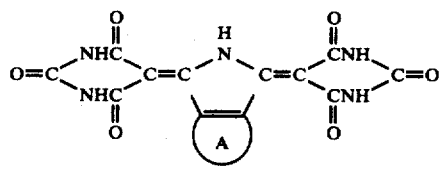

wherein

represents an o-phenylene group or a 1,2- or 2,3-naphthylene group, each of which may have a phenyl group as a substituent, said pigment being dissolved in said aromatic polyester.

2. The colored aromatic polyester shaped article of claim 1 wherein the aromatic polyester is polyethylene terephthalate.

3. The colored aromatic polyester shaped article A of claim 1 wherein the aromatic polyester is polybutylene terephthalate.

4. The colored aromatic polyester shaped article of any one of claims 1 to 3 wherein the amount of the barbituric acid-type pigment is from 0.01 to 0.5% by weight.

5. The colored aromatic polyester shaped article of claim 4 wherein

is o-phenylene.

6. A method for the preparation of a colored aromatic polyester composition comprising melting an aromatic polyester and a barbituric acid-type pigment, as a coloring agent, of the formula

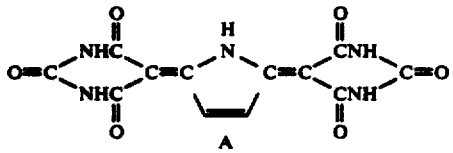

wherein

represents an o-phenylene group or a 1,2- or 2,3-naphthylene group, each of which may have a phenyl group as a substituent, so that the barbituric acid-type pigment becomes soluble in the aromatic polyester.

7. The method of claim 6 wherein the aromatic polyester is polyethylene terephthalate.

8. The method of claim 6 wherein the aromatic polyester is polybutylene terephthalate.

9. The method of claim 6 wherein from 0.01 to 0.5% by weight of the barbituric acid-type pigment is used.

10. The method of claim 6 wherein

represent an o-phenylene group.

* * * * *